(12) United States Patent
Horii

(10) Patent No.: US 6,446,996 B1
(45) Date of Patent: Sep. 10, 2002

(54) FRAME STRUCTURE OF MOTORCYCLE

(75) Inventor: Yoshiyuki Horii, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,059

(22) Filed: Sep. 5, 2000

(30) Foreign Application Priority Data

Sep. 5, 1999 (JP) .......................................... 11-291433

(51) Int. Cl.$^7$ ................................................. B62K 1/00
(52) U.S. Cl. ............................... 280/281.1; 280/288.3; 280/797; 180/311
(58) Field of Search ............................. 280/227, 219, 280/284, 281.1, 288.3, 797; 180/219, 227, 311

(56) References Cited

U.S. PATENT DOCUMENTS

| | | | | |
|---|---|---|---|---|
| 4,556,119 A | * | 12/1985 | Shiratsuchi | 180/219 |
| 4,673,053 A | * | 6/1987 | Tanaka et al. | 180/227 |
| 5,261,504 A | * | 11/1993 | Katura | 180/219 |
| 5,375,677 A | * | 12/1994 | Yamagiwa et al. | 180/219 |
| 5,803,477 A | * | 9/1998 | Reisinger | 280/284 |
| 5,921,339 A | * | 7/1999 | Matsura | 180/219 |
| 6,024,185 A | * | 2/2000 | Okada et al. | 180/227 |
| 6,131,684 A | * | 10/2000 | Tichnovich | 180/227 |
| 6,206,398 B1 | * | 3/2002 | Yanai et al. | 280/284 |

FOREIGN PATENT DOCUMENTS

| | | | |
|---|---|---|---|
| JP | Y2121919 | | 6/1989 |
| JP | 401289776 A | * | 11/1989 |

* cited by examiner

*Primary Examiner*—Avraham Lerner
*Assistant Examiner*—Daniel Yeagley
(74) *Attorney, Agent, or Firm*—Birch, Stewart, Kolasch & Birch, LLP

(57) ABSTRACT

A high-rigidity, light-weight pivot frame is provided. The pivot frame is separated into an upper cross member on the upper side and a pair of right and left pivot plate portions on the lower side. The upper cross member is a hollow forging with a neck portion and arm portions protruding to the right and left from the lower end. A fitting projection is formed in the forward end of each arm portion. The pivot plate portion is a thin forging with a number of recesses and ribs formed on the inside surface side, and can easily be assembled in proper position by fitting the fitting projection into a connecting recess formed in the upper end.

10 Claims, 7 Drawing Sheets

FRAME STRUCTURE OF MOTORCYCLE

BACKGROUND OF THE INVENTION

1. Field of the Invention

The present invention relates to a frame structure of a motorcycle, and more particularly, to a new structure of a pivot plate supporting a swing arm.

2. Description of the Background Art

Japanese Utility Model Laid-Open No. H1-21919 discloses a vehicle frame structure in which the inserting portion of the pipe member is formed by jointing two plate members into an oval shape, and the pipe member is inserted therein and welded in one body. Furthermore, it is a known practice to form the pivot frame which supports the swing arm by forging.

The pivot plates of the aforesaid construction must be attached to a frame member by welding, and therefore cannot be easily positioned properly at this time. Furthermore, in the case of an off-road motorcycle which undergoes a great impact load during operation, the frame structure is required to have a greater rigidity. To realize this in the prior art frame structure, it is necessary to considerably increase the weight. It is, therefore, an object of this invention to provide an easy-to-assemble, light-weight frame structure capable of obtaining a great rigidity.

SUMMARY OF THE INVENTION

To solve the above-described problem, the frame structure of a motorcycle according to this invention has one main pipe extended from a head pipe to the rear, and passing above an engine. A pivot frame is attached at the upper end side to the rear end of the main pipe and extends downwardly to support the front end of a swing arm capable of swinging movements. The frame structure of a motorcycle is characterized in that the pivot frame is provided with a pair of right and left pivot plates which pivotally support the swing arm, and an upper cross member attaching the upper end of the pivot plates. The upper cross member is provided with a cross section extended laterally, attaching the upper end of the pivot plates to the right and left ends. The pivot plates are formed by forging.

The frame structure has an upper cross member, the cross member of which project laterally at either end. This enables the right and left pivot plates overlapped with the forward end of each cross member to be attached by welding. Forming a shallow recess in the pivot plate jointing section is sufficient, and therefore a high-rigidity forging is usable, consequently enabling weight reduction despite its high rigidity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
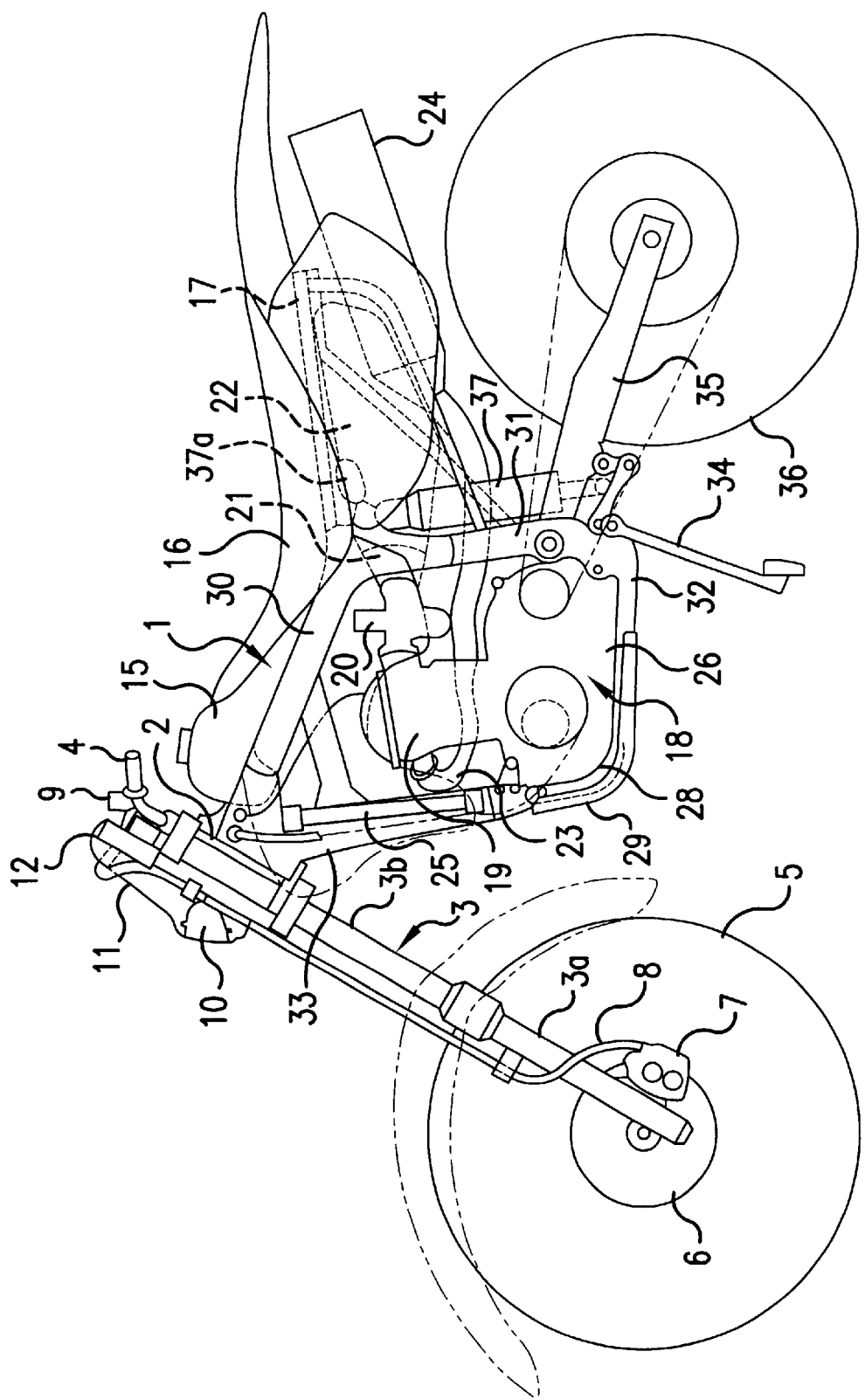
FIG. 1 is a general side view of a motorcycle according to the present embodiment.

By referring to the accompanying drawings, one embodiment of the frame structure according to this invention will be explained. First, the general structure of a vehicle body will be outlined by referring to FIG. 1. The motorcycle is of the off-road type. A head pipe 2 is mounted at the front end part of a vehicle frame 1. A front fork 3 is rotatably supported on the head pipe 2, and is steered by a handlebar 4. A front wheel 5 is supported on the lower end portion of the front fork 3, along with a front wheel brake system including a brake disk 6 and a brake caliper 7.

One end of a brake hose 8 is connected to the brake caliper 7, and 15 the other end is connected to a master cylinder 9 located in the vicinity of a brake lever (not shown) of the handlebar 4. The intermediate portion of the brake hose 8 is installed nearly along the front fork 3. Reference numeral 3a denotes an outer tube of the front fork 3, and reference numeral 3b denotes an inner tube. The motorcycle also includes a headlight 10, a light case 11 (small front cover) serving also as a number plate, and a dashboard 12.

A fuel tank 15 is supported on the upper surface of the vehicle frame 1. A seat 16 is mounted beside the fuel tank 15. The seat 16 is supported on a seat rail 17 extending toward the rear from the rear shoulder portion of the vehicle frame 1. The vehicle frame 1 is loop-shaped as viewed from the side, and supports a water-cooled engine 18. The intake port of the water-cooled engine 18 is connected to a carburetor 20 from the rear of a cylinder 19. The carburetor 20 is connected to an air cleaner 22 located below the seat through a connecting tube 21.

An exhaust pipe 23 is connected at the front end portion to the exhaust port of the cylinder 19. The exhaust pipe extends forward and is bent at a steep angle, then extends rearward on the same side, but apart on upper and lower sides, and finally is connected to a muffler 24 at the rear of the vehicle body.

The cooling system is located at the front of the cylinder 19. The cooling water is supplied from a radiator 25 supported on the vehicle frame 1 into a water pump (not shown) located in a crankcase 26 of the water-cooled engine 18. The cooling water is sent from the water pump into the engine 18, and cools the cylinder 19. A reservoir tank 28 is mounted between the crankcase 26 and a skid plate 29.

The front side of the vehicle frame 1 is comprised, in a loop form, of a main pipe 30, a pivot frame 31, a lower frame 32, and a front down pipe 33. A front end of a swing arm 35 is pivotally supported on the pivot frame 31. A rear wheel 36 is supported on the rear end of this swing arm 35. One end of a rear cushion unit 37 is attached to an intermediate portion of the swing arm 35 via a link, and the other end of the rear cushion unit 37 extends upwardly to be supported on the pivot frame 31.

A reservoir tank 37*a* is mounted on the upper end section of the rear cushion unit 37. The reservoir tank 37*a* is mounted on the opposite side of the connecting tube 21 of the vehicle body and the exhaust tube 23, protruding to a position in which the passage of the exhaust pipe 23 is checked. A side stand 34 is mounted on the lower end portion of the pivot frame 31.

In the lubrication system, a part of the vehicle frame serves as an oil tank built into the frame, which supplies the oil to the oil pump of the crankcase 26.

Figure 2:
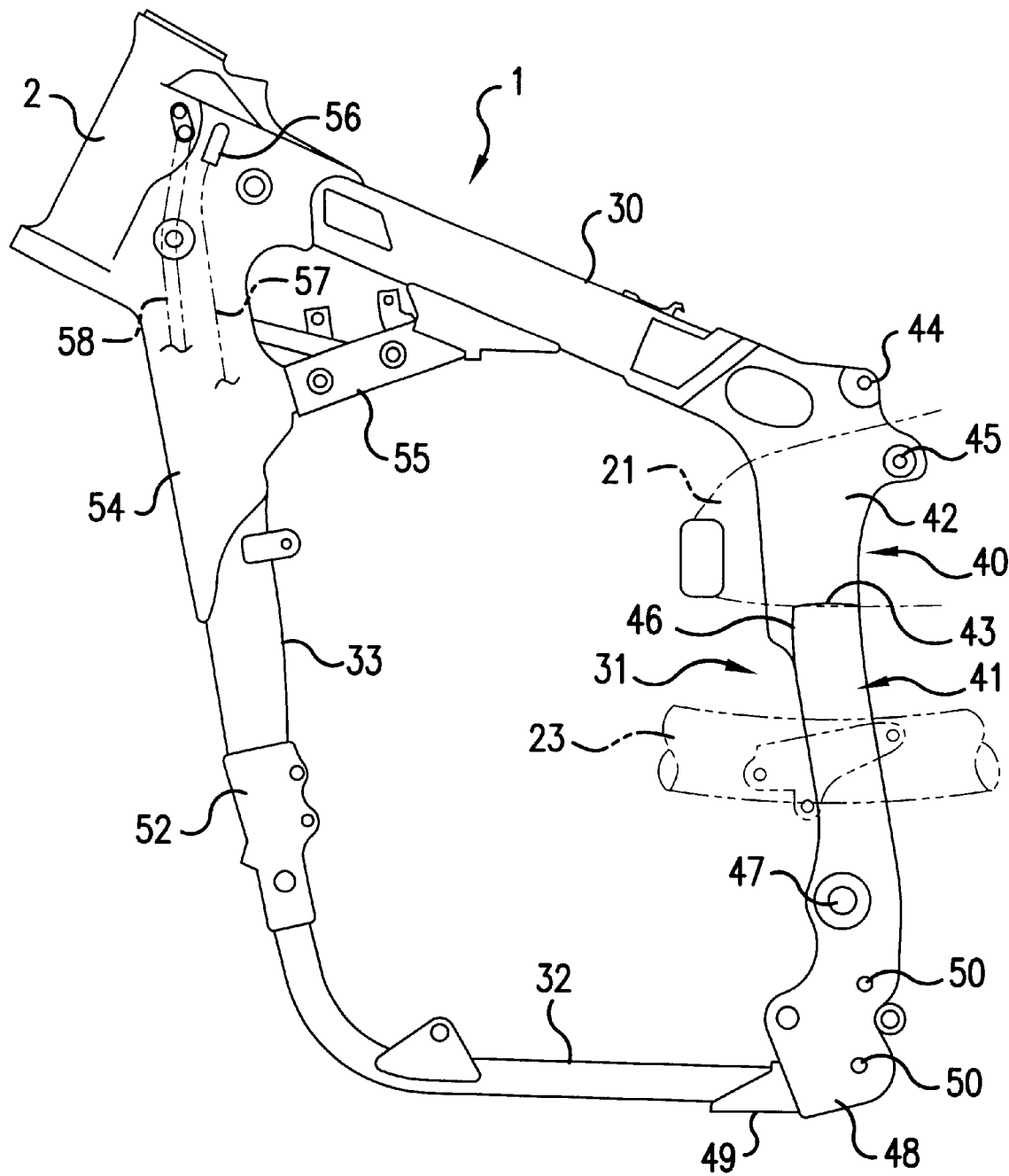
FIG. 2 is a side view of a major portion of the vehicle frame.
Figure 3:
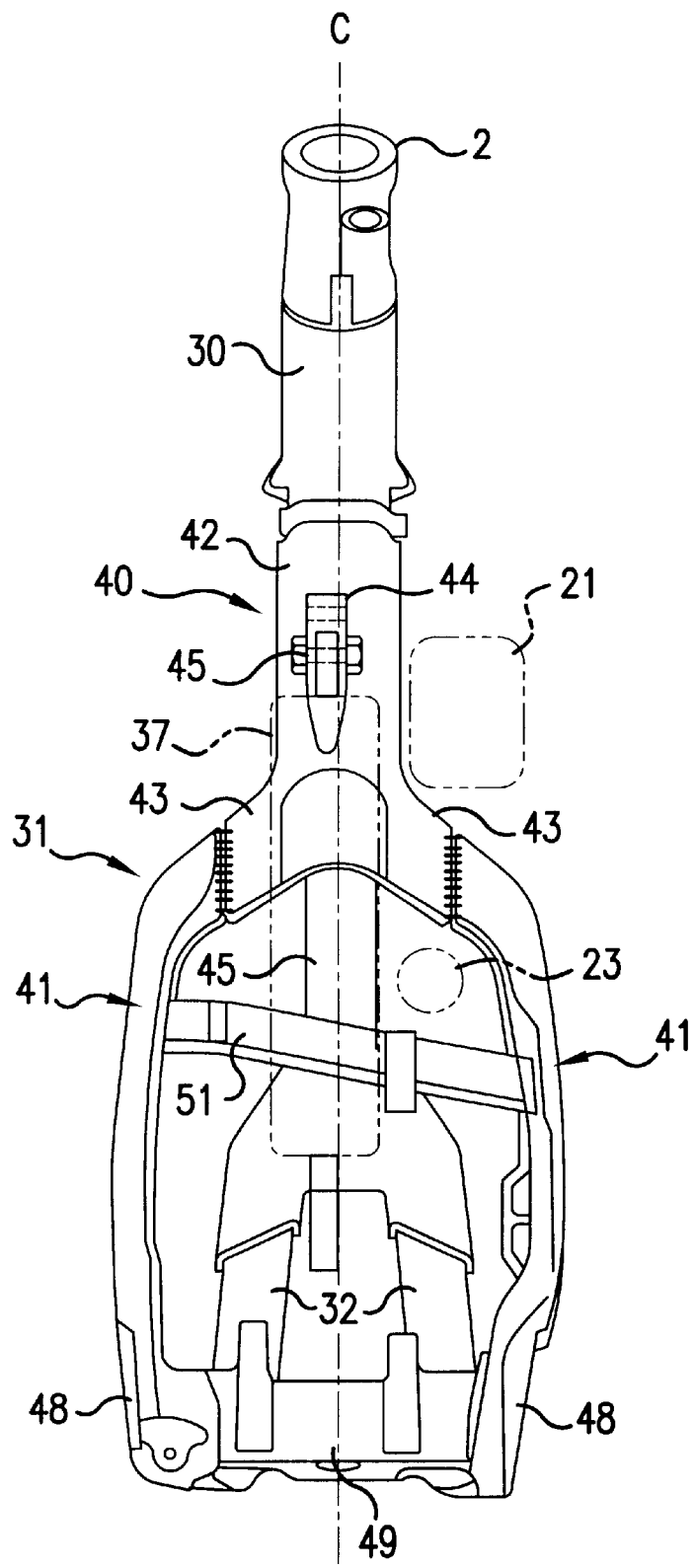
FIG. 3 is a rear view thereof.

Next, the vehicle frame 1 will be explained in detail. FIG. 2 is a side view showing the vehicle frame 1, and FIG. 3 is a rear view thereof. As is clear from these drawings, the vehicle frame 1 is a single pipe member installed along the center of the vehicle body. The pivot frame 31 is separated into an upper cross member 40 on the upper half side and a pivot plate portion 41 on the lower half side. The pivot plate 41 includes a pair of right and left members.

The upper cross member 40 is a forging, which has a neck portion 42 extending up and down along the center of the vehicle body and welded at the upper end thereof to the rear end portion of the main pipe 30. The upper cross member 40 also has an arm portion 43 branched off and projecting to right and left sides at the lower end. At the rear part of the neck portion 42, a mounting boss 44 of the seat rail 17 and a mounting boss 45 at the upper end of the rear cushion unit 37 located beneath the mounting boss 44 are formed as one body.

The pivot plate portion 41 is a forging having many ribs formed on the inside surface. The upper end 46 thereof is fitted into the arm portion 43 and lap-welded together. A pivot portion 47 is provided in the intermediate portion of the pivot plate portion 41 to support the swing arm 35 on a bearing. The lower end portion 48 is fitted sideways into the lower cross member 49 and is welded.

Holes 50 for mounting the stand bracket are formed in the side of the lower end portion 48. The lower cross member 49 connects a pair of lower frames 32, right and left, at the rear ends as shown in FIG. 3. A cross plate 51 is mounted above the lower cross member 49 for obliquely connecting the intermediate portions of the right and left pivot plate members 41.

The rear cushion unit 37, as shown in FIG. 3, is mounted in a vertical direction, being supported at the upper end on a mounting boss 45. The center of the rear cushion unit 37 is deviated leftward from the centerline C in the vertical direction of the vehicle body.

Figure 4:
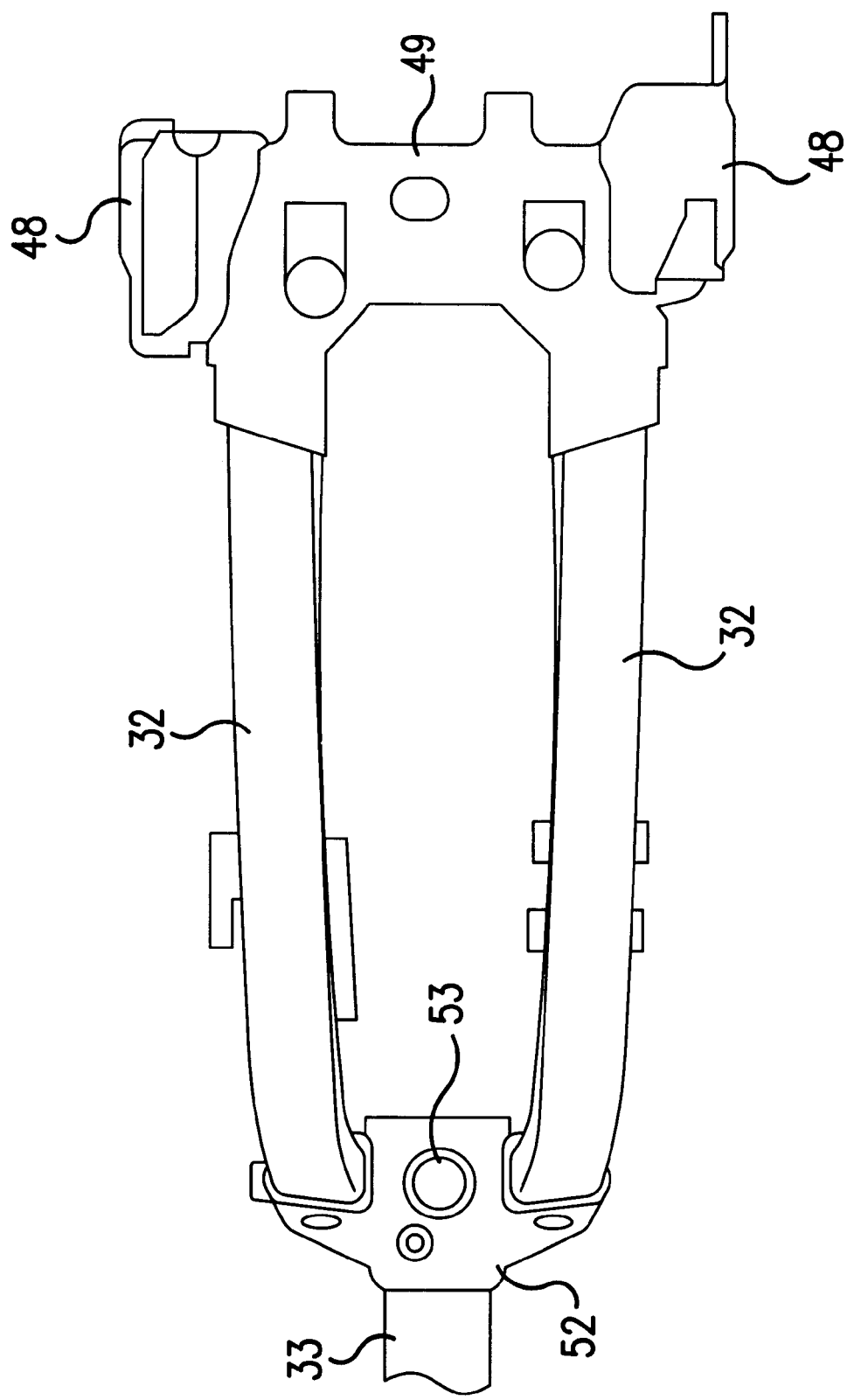
FIG. 4 is a bottom view thereof.

FIG. 4 is a bottom view of the lower frame 32, which is connected at the rear end by the lower cross member 49. The lower frame 32 is narrow at the front end, being connected to a joint member 52 provided at the lower end of the front down pipe 33. The joint member 52 is a member bifurcated at the lower part, where a drain hole 53 is provided.

The joint member 52 serves as a member for closing the lower end of the front down pipe 33, which functions also as the built-in oil tank. As shown in FIG. 2, the front down pipe 33 forms a tank section 54 made of an aluminum alloy having high thermal conductivity and cast unitarily with the head pipe 2. A reinforcing pipe 55 is connected at the rear part of the tank section 54 and to the main pipe 30.

A breather pipe 56 is installed in the connecting part between the upper portion of the head pipe 2 and the front end of the main pipe 30. The breather pipe is connected to the upper portion of the cylinder 19 by a breather tube 57. An oil return port is provided in the vicinity thereof to which an oil return pipe 58 from the oil pump in the lower part of the crankcase 26 is connected.

Next, the pivot frame 31 will be explained in detail with reference to FIGS. 5–7. The upper cross member 40 is a hollow forging made of an aluminum alloy, which has a fitting projection 60 on either end of the right and left arm portions 43. The fitting projection 60 allows fitting when the pivot plate portion 41 is installed from the right and left, and further facilitates positioning of the pivot plate portion 41. A fitting portion 61 is also formed at the forward end of the neck portion 42, for attaching the neck portion 42 to the rear end of the main pipe 30.

Figure 6:
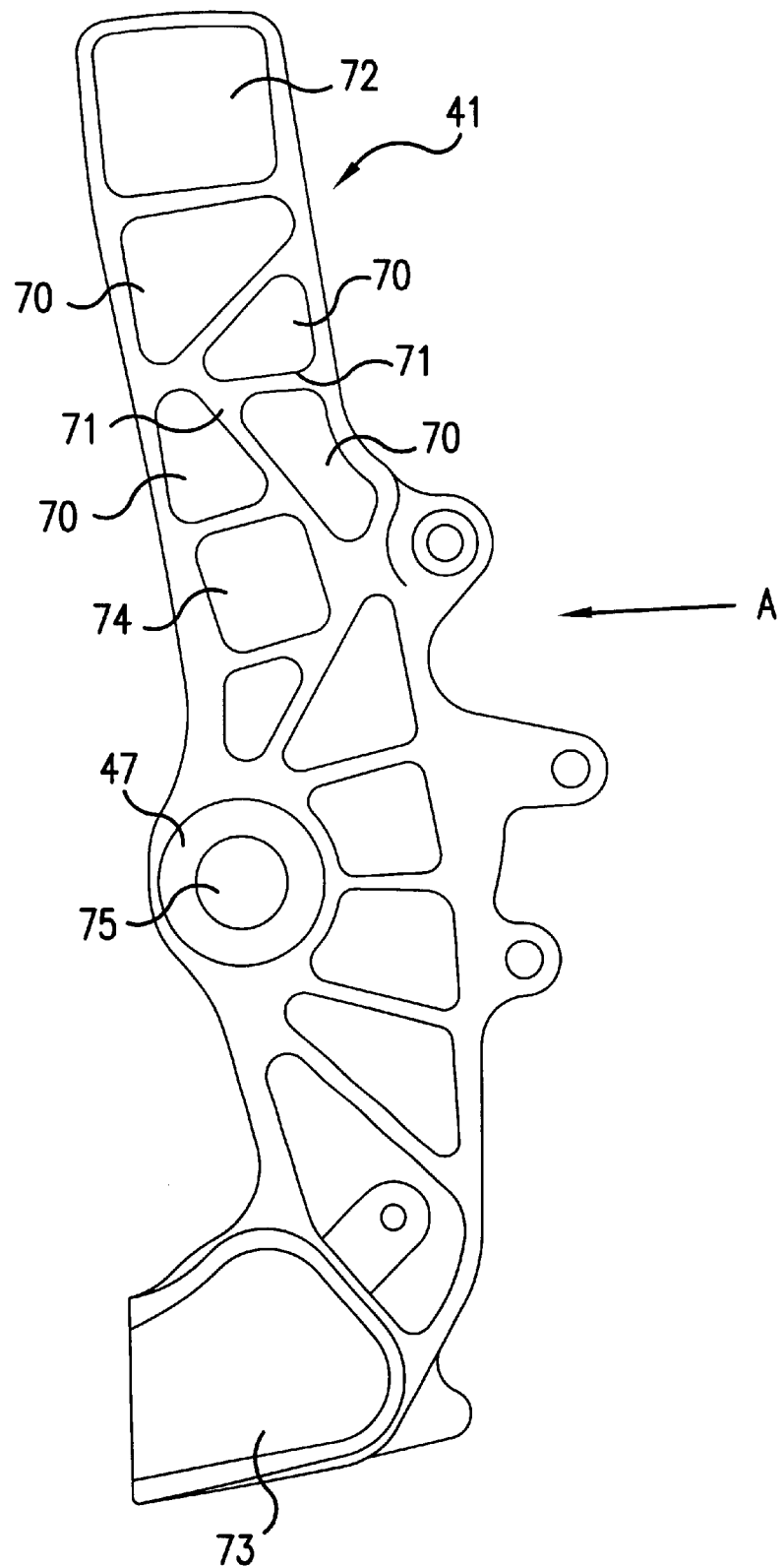
FIG. 6 is a view showing the inside surface of a pivot plate portion 41.
Figure 7:
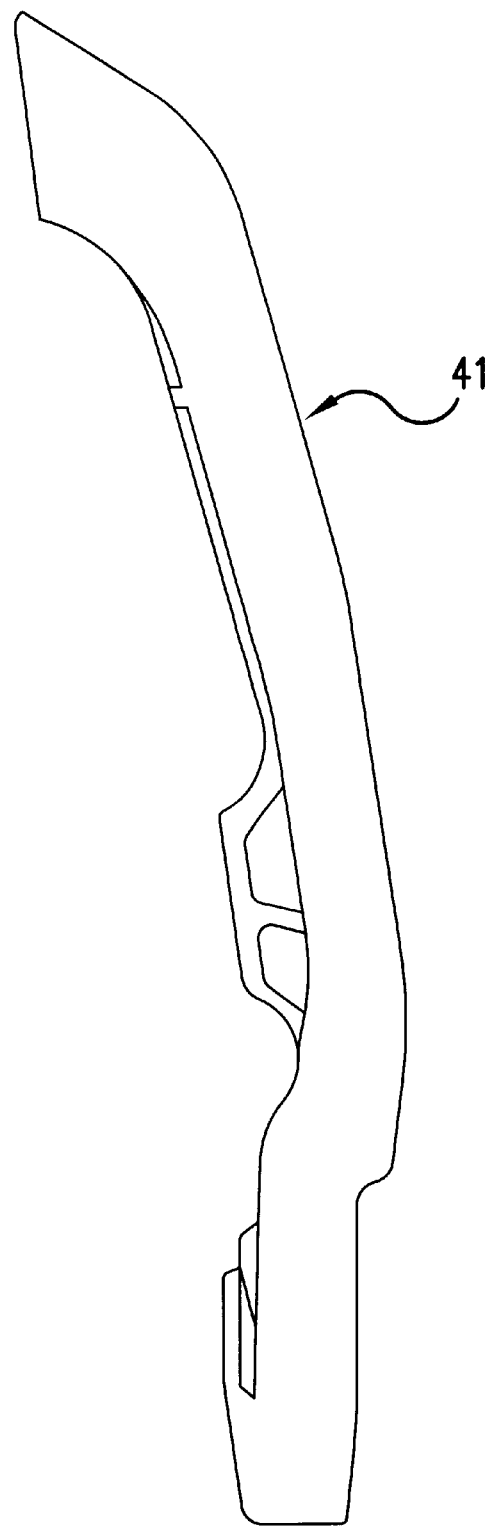
FIG. 7 is a view taken along the direction of the arrow A thereof.

The pivot plate portion 41 is provided with a number of ribs 71 formed on the inside surface, bordering a number of recesses 70 as shown in FIG. 6. The recess in the upper end is a connecting recess 72 in which the fitting projection 60 of the arm portion 43 is fitted. Similarly, in the lower end, a connecting recess 73 is provided for fitting the side portion of the lower cross member 49. Furthermore, in the intermediate portion, a connecting recess 74 is formed for fitting one of both ends of the cross plate 51. Reference numeral 75 denotes a pivot bearing hole.

Figure 5:
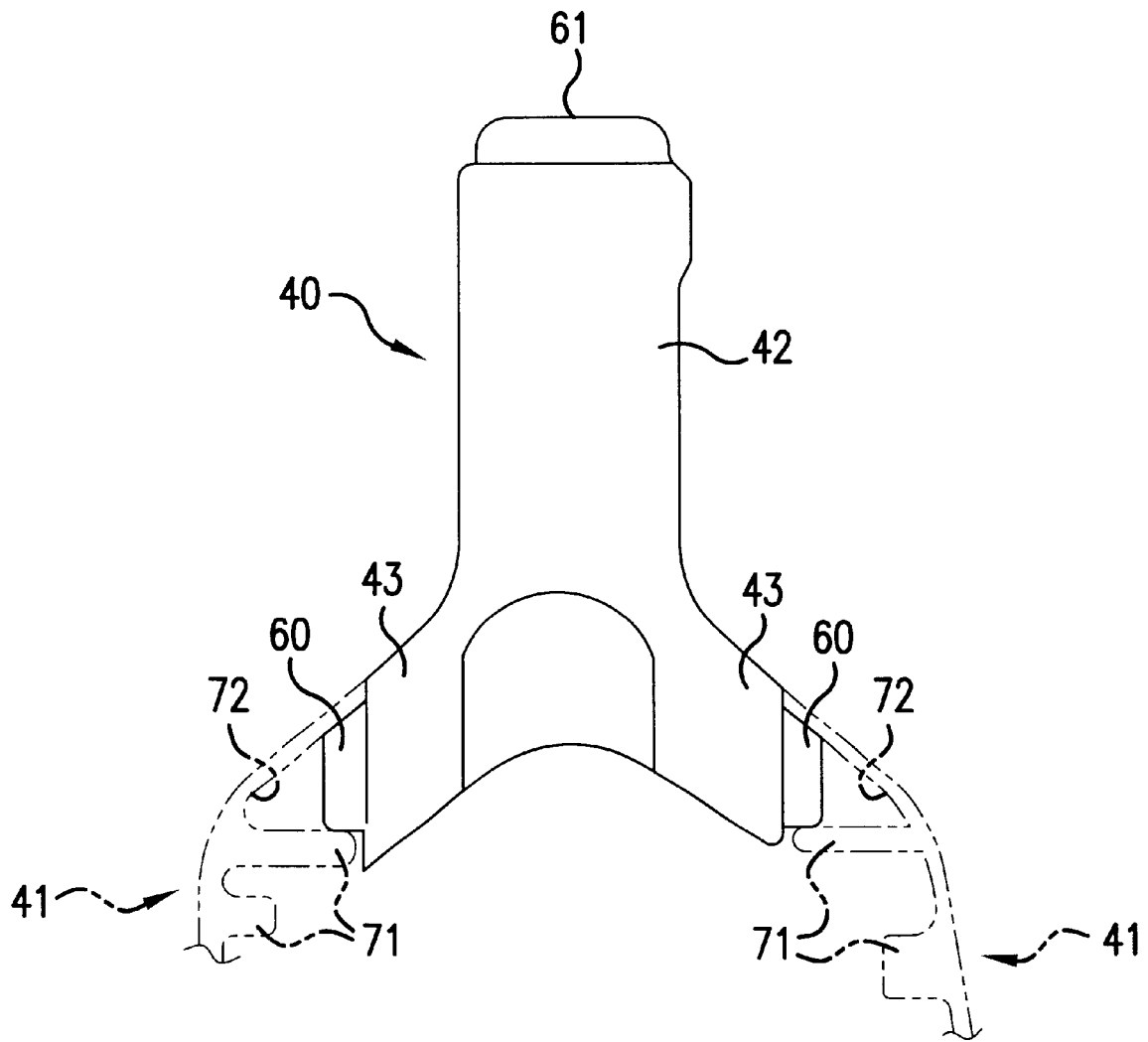
FIG. 5 is a view showing details of an upper cross member 40.

In the pivot plate portion 41 shown in FIG. 5 a number of recesses 70 are formed. Therefore, the actual thickness of the pivot plate portion 41 is considerably less than the outside appearance shown in FIG. 7, and accordingly is suitable for forging. The pivot plate portion 41 has a sufficiently high rigidity which is achieved by forging and by forming a number of ribs 71.

Next, operation of the present embodiment will be explained. To assemble this frame, the connecting recess 72 of the pivot plate portion 41 is first fitted to each fitting projection 60 on the right and left arm portions 43 of the upper cross member 40. The arm portion 43 and the pivot plate portion 41 are positioned by fitting the connecting recess 72 to the fitting projection 41. Accordingly, the arm portion 43 and the pivot plate portion 41 can be easily assembled without any difficult positioning operations, and can then be properly joined by welding.

The assembling procedure stated above is similarly applicable to the cross plate 51 and the lower cross member 49, which can easily be positioned by fitting the cross plate 51 at the end portion into the connecting recess 74, and the lower cross member 49 at each side into the connecting recess 73.

Because the frame structure is formed such that the pivot plate portion 41 is connected by fitting the fitting projection 60 into the connecting recess 73, it is possible to reduce the thickness of the pivot plate portion 41, thereby enabling application of the forging process to the pivot plate portion 41. As a result, it is possible to obtain a high-rigidity, light-weight pivot frame 31 which could not be achieved in the prior art. Particularly, the structure is suitable to the pivot frame 31 of an off-road vehicle which is subjected to a great impact load during operation.

It should be noted that the present invention is not limited to the embodiments explained above and various many modifications are possible within the scope of the invention. For example, a simple pipe-shaped or plate-shaped cross member may be utilized in place of the upper cross member 40, and may be fitted at both ends to the pivot plate portion 41. Such variations are not to be regarded as a departure from the spirit and scope of the invention, and all such modifications as would be obvious to one skilled in the art are to be included within the scope of the following claims.

What is claimed is:

1. A frame structure of a motorcycle comprising:
   a main pipe extending from a head pipe toward a rear of the motorcycle and passing above an engine; and a pivot frame attached at an upper end side to a rear end of said main pipe and extending downwardly to support a front end of a swing arm capable of swinging movement, said pivot frame including:
    a pair of right and left pivot plates which pivotally support said swing arm, said pivot plates being forged from an aluminum alloy, each of said pivot plates including a plurality of ribs separated by recesses; and
    an upper cross member attaching the upper ends of said pivot plates together, said upper cross member being provided with a cross arm member extending laterally, attaching the upper end of said pivot plates to right and left ends of said cross arm member, said upper cross member being made from an aluminum alloy aid formed as one body with a mounting boss for a rear cushion unit,
each of said pivot plates further comprising a first connecting recess at an upper end thereof for receiving fitting projections located at distal ends of said cross arm member, each said first connecting recess having an approximately rectangular configuration formed by an upper portion of said pivot plate and an inner one of said ribs, wherein said first connecting recesses guide and stabilize said fitting projections to fit into the approximately rectangular configuration of the first connecting recesses to facilitate permanent connection by welding.

2. The frame structure according to claim 1, further comprising a front down pipe extending downwardly from said head pipe, a pair of lower frame pipes extending rearwardly from a lower end of said front down pipe, and a lower cross member attached to rear ends of said lower frame pipes.

3. The frame structure according to claim 2, each of said pivot plates further comprising a second connecting recess at a lower end thereof for receiving fitting projections located on said lower cross member.

4. The frame structure according to claim 1, further comprising a front down pipe extending downwardly from said head pipe, a pair of lower frame pipes extending rearwardly from a lower end of said front down pipe, and a lower cross member attached to rear ends of said lower frame pipes, each of said pivot plates further comprising a second connecting recess at a lower end thereof for receiving fitting projections located on said lower cross member, wherein said second connecting recesses guide and stabilize said fitting projections of said lower cross member therein to facilitate permanent connection by welding.

5. The frame structure according to claim 4, each of said pivot plates further comprising a third connecting recess at an intermediate location along the pivot plates for receiving fitting projections located on an intermediate cross member.

6. A frame structure of a motorcycle comprising:
a head pipe;
a main pipe extending rearwardly from said head pipe; and
a pivot frame attached to a rear end of said main pipe, said pivot frame extending downwardly to support a front end of a swing arm, said pivot frame including:
    a pair of spaced-apart right and left pivot plates which pivotally support said swing arm, said pivot plates being forged from an aluminum alloy, each of said pivot plates including a plurality of ribs separated by recesses; and
    an upper cross member having a neck portion at an upper end thereof and a pair of arm portions at a lower end thereof, said neck portion being attached to said rear end of said main pipe, said arm portions being attached to upper ends of said right and left pivot plates, said upper cross member being made from an aluminum alloy and formed as one body with a mounting boss for a rear cushion unit,
each of said pivot plates further comprising a first connecting recess at an upper end thereof for receiving fitting projections located at distal ends of said arm portions, each said first connecting recess having an approximately rectangular configuration formed by an upper portion of said pivot plate and an inner one of said ribs, wherein said first connecting recesses guide and stabilize said fitting projections to fit into the approximately rectangular configuration of the first connecting recesses to facilitate permanent connection by welding.

7. The frame structure according to claim 6, further comprising a front down pipe extending downwardly from said head pipe, a pair of lower frame pipes extending rearwardly from a lower end of said front down pipe, and a lower cross member attached to rear ends of said lower frame pipes.

8. The frame structure according to claim 7, each of said pivot plates further comprising a second connecting recess at a lower end thereof for receiving fitting projections located on said lower cross member.

9. The frame structure according to claim 6, further comprising a front down pipe extending downwardly from said head pipe, a pair of lower frame pipes extending rearwardly from a lower end of said front down pipe, and a lower cross member attached to rear ends of said lower frame pipes, each of said pivot plates further comprising a second connecting recess at a lower end thereof for receiving fitting projections located on said lower cross member, wherein said second connecting recesses guide and stabilize said fitting projections of said lower cross member therein to facilitate permanent connection by welding.

10. The frame structure according to claim 9, each of said pivot plates further comprising a third connecting recess at an intermediate location along the pivot plates for receiving fitting projections located on an intermediate cross member.

* * * * *